United States Patent
George

(10) Patent No.: US 8,880,122 B2
(45) Date of Patent: Nov. 4, 2014

(54) SYSTEM AND METHOD FOR IDENTIFYING DEVICES IN A WIRELESS NETWORK

(75) Inventor: Moses Lynn George, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 1000 days.

(21) Appl. No.: 11/897,972

(22) Filed: Aug. 31, 2007

(65) Prior Publication Data

US 2009/0061946 A1 Mar. 5, 2009

(51) Int. Cl.
*H04M 1/00* (2006.01)
*H04W 8/00* (2009.01)
*H04W 84/18* (2009.01)

(52) U.S. Cl.
CPC .............. *H04W 8/005* (2013.01); *H04W 84/18* (2013.01)
USPC ...... 455/566; 455/41.2; 455/41.3; 455/414.2; 455/456.1; 455/457; 455/455; 455/456.2; 370/338; 370/401; 370/465; 370/449; 709/225; 709/204; 709/206

(58) Field of Classification Search
USPC ........ 455/41.1, 41.2, 41.3, 566, 550.1, 556.1, 455/557, 456.3, 457, 458, 411.3, 414.2, 455/456.1, 455, 456.2; 370/338, 401, 449, 370/465; 709/225, 204, 206
See application file for complete search history.

(56) References Cited

U.S. PATENT DOCUMENTS

| | | | |
|---|---|---|---|
| 6,826,387 B1 | 11/2004 | Kammer | |
| 7,010,268 B2* | 3/2006 | Chen | 455/41.2 |
| 7,110,382 B2 | 9/2006 | Sharma et al. | |
| 2003/0124978 A1* | 7/2003 | Virtanen | 455/41 |
| 2003/0165129 A1* | 9/2003 | Sharma et al. | 370/338 |
| 2004/0157589 A1* | 8/2004 | Watanabe et al. | 455/415 |
| 2004/0258032 A1* | 12/2004 | Kawamura | 370/338 |
| 2005/0070335 A1* | 3/2005 | Jitsuishi et al. | 455/566 |
| 2007/0123165 A1 | 5/2007 | Sheynman et al. | |
| 2007/0123166 A1* | 5/2007 | Sheynman et al. | 455/41.2 |
| 2007/0129013 A1 | 6/2007 | Mehta et al. | |
| 2007/0129112 A1* | 6/2007 | Tarn | 455/566 |
| 2007/0167137 A1* | 7/2007 | Watanabe et al. | 455/41.2 |
| 2007/0207791 A1* | 9/2007 | Sasaki | 455/418 |
| 2008/0014973 A1* | 1/2008 | Cho | 455/466 |
| 2008/0139116 A1* | 6/2008 | Balgard et al. | 455/41.2 |
| 2010/0035549 A1* | 2/2010 | Fujii | 455/41.3 |

* cited by examiner

*Primary Examiner* — Junpeng Chen
(74) *Attorney, Agent, or Firm* — Mahamedi Paradice LLP

(57) ABSTRACT

A mobile computing device includes a processor, a transceiver coupled to the processor, and a display device coupled to the processor. The processor is configured to display a plurality of first names representing a plurality of electronic devices on the display device, each first name associated with one of the electronic devices, each of the electronic devices being capable of communicating with the mobile computing device. The processor is further configured to receive a selection of one of the first names, and display a second name in response to the selection of the selected first name, the second name being associated with the first name.

18 Claims, 5 Drawing Sheets

SYSTEM AND METHOD FOR IDENTIFYING DEVICES IN A WIRELESS NETWORK

BACKGROUND

The present application relates generally to the field of mobile computing devices, and more specifically, to systems and methods for identifying and establishing wireless communications with electronic devices using a mobile computing device.

Mobile devices may be used to communicate with a variety of electronic devices, including computers such as desktop computers, laptop computers, personal digital assistants (PDAs), etc., mobile phones such as cellular phones, etc., printers, fax machines, and so on. Communications with such devices may include, for example, communications utilizing the Bluetooth communications protocol.

However, with the increasing number of Bluetooth-compatible devices, users may be provided with large numbers of available devices when attempting to establish a Bluetooth link with one or more other devices, making it a relatively slow and laborious process to properly identify and connect with the desired device.

BRIEF DESCRIPTION

DETAILED DESCRIPTION

Figure 3:
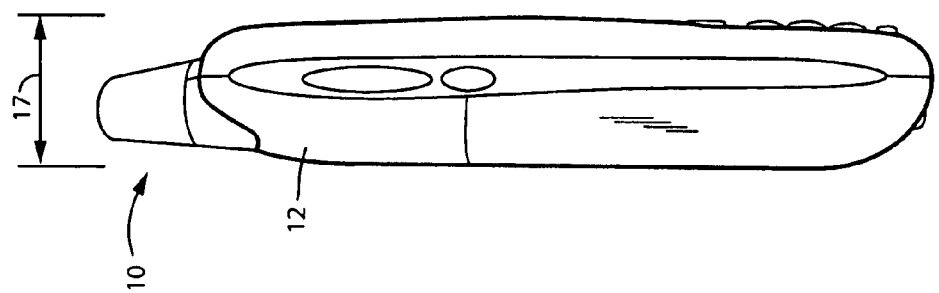
FIG. 3 is a side view of the mobile computing device of FIG. 1 according to an exemplary embodiment.
Figure 2:
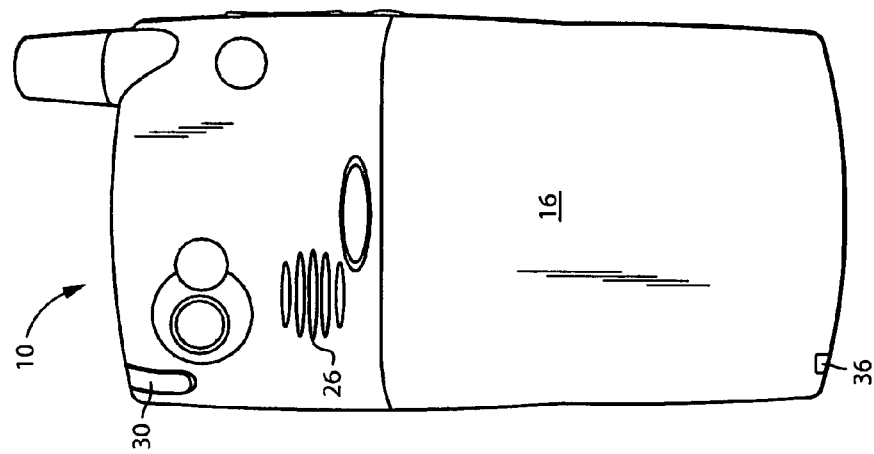
FIG. 2 is a back view of the mobile computing device of FIG. 1 according to an exemplary embodiment.
Figure 1:
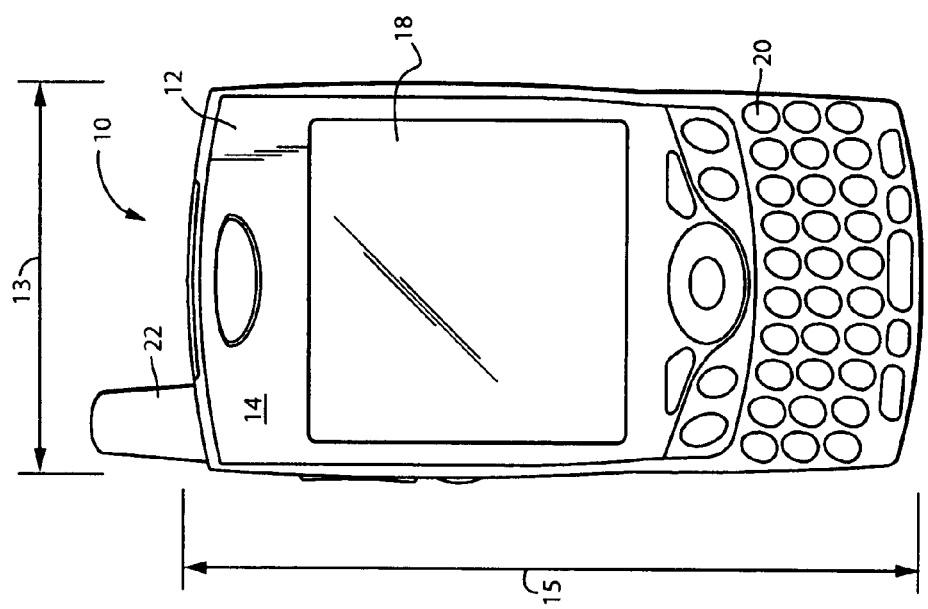
FIG. 1 is a front view of a mobile computing device according to an exemplary embodiment.

Referring to FIGS. 1-3, a mobile computing device 10 is shown. The teachings herein can be applied to device 10 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 10 is a smartphone, which is a combination mobile telephone and handheld computer having PDA functionality. PDA functionality can comprise one or more of personal information management (e.g., including personal data applications such as email, calendar, phone, text messaging, etc.), database functions, word processing, spreadsheets, voice memo recording, Global Positioning System (GPS) functionality, etc. Device 10 is configured to synchronize personal information from these applications with a computer (e.g., a desktop, laptop, server, etc.). Device 10 is further configured to receive and operate additional applications provided to device 10 after manufacture, e.g., via wired or wireless download, SecureDigital card, etc.

As shown in FIGS. 1-3, device 10 includes a housing 12 and a front side 14 and a back side 16. Device 10 further comprises a display 18 and a user input device 20 (e.g., a QWERTY keyboard, buttons, touch screen, speech recognition engine, etc.). Display 18 can comprise a touch screen display in order to provide user input to a processor 40 (see FIG. 4) to control functions, such as to select options displayed on display 18, enter text input to device 10, or enter other types of input. Display 18 also provides images (see, e.g., FIG. 6) that are displayed and may be viewed by users of device 10. User input device 20 can provide similar inputs as those of touch screen display 18. Device 10 can further comprise a speaker 26, and a stylus 30 to assist the user in making selections on display 18.

According to an exemplary embodiment, housing 12 is configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment. Device 10 may be a handheld computer, which is a computer small enough to be carried in a typical front pocket found in a pair of pants, comprising such devices as typical mobile telephones and personal digital assistants, but excluding typical laptop computers and tablet PCs.

In various embodiments, housing 12 could be any size, shape, and dimension. In some embodiments, housing 12 has a width 13 of no more than about 200 mm or, alternatively, no more than about 100 mm. According to some of these embodiments, housing 12 has a width 13 of no more than about 85 mm or, alternatively, no more than about 65 mm. According to some embodiments, housing 12 has a width 13 of at least about 30 mm or, alternatively, at least about 50 mm. According to some of these embodiments, housing 12 has a width 13 of at least about 55 mm.

In some embodiments, housing 12 has a length 15 of no more than about 200 mm or, alternatively, no more than about 150 mm. According to some of these embodiments, housing 12 has a length 15 of no more than about 135 mm or, alternatively, no more than about 125 mm. According to some embodiments, housing 12 has a length 15 of at least about 70 mm or, alternatively, at least about 100 mm. According to some of these embodiments, housing 12 has a length 15 of at least about 100 mm.

In some embodiments, housing 12 has a thickness 17 of no more than about 150 mm or, alternatively, no more than about 50 mm. According to some of these embodiments, housing 12 has a thickness 17 of no more than about 30 mm or, alternatively, no more than about 25 mm. According to some embodiments, housing 12 has a thickness 17 of at least about 10 mm or, alternatively, at least about 15 mm. According to some of these embodiments, housing 12 has a thickness 17 of at least about 50 mm.

In some embodiments, housing 12 has a volume of up to about 2500 cubic centimeters or, alternatively, up to about 1500 cubic centimeters. In some alternative embodiments, housing 12 has a volume of up to about 1000 cubic centimeters or, alternatively, up to about 600 cubic centimeters.

Figure 4:
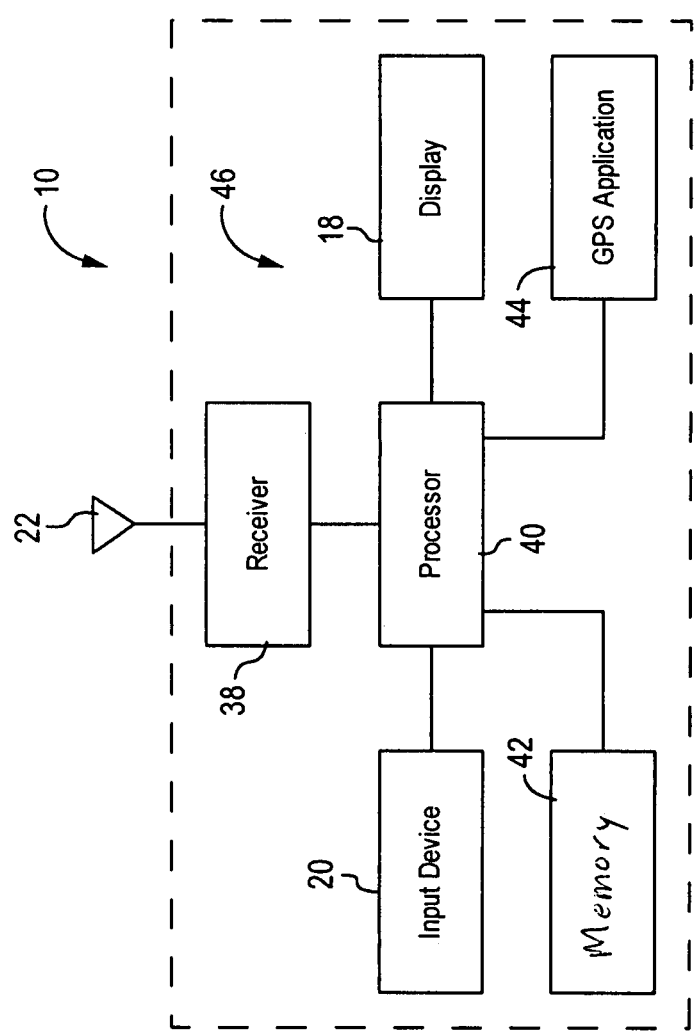
FIG. 4 is a block diagram of the mobile computing device of FIG. 1 according to an exemplary embodiment.

Referring now to FIG. 4, device 10 comprises a processing circuit 46 comprising a processor 40. Processor 40 can comprise one or more microprocessors, microcontrollers, and other analog and/or digital circuit components configured to perform the functions described herein. Processor 40 comprises one or more memories (e.g., random access memory, read only memory, flash, etc.) configured to store software applications provided during manufacture or subsequent to manufacture by the user or by a distributor of device 10. In one embodiment, processor 40 can comprise a first applications microprocessor configured to run a variety of personal information management applications, such as email, a calendar, contacts, etc., and a second, radio processor on a separate chip or as part of a dual-core chip with the application processor. The radio processor is configured to operate telephony functionality. Device 10 can be configured for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured for data communication functionality, for example, via GSM with General Packet Radio Service (GPRS) systems (GSM/GPRS), CDMA/1XRTT systems, Enhanced Data Rates for Global Evolution (EDGE) systems, Evolution Data Only or Evolution Data Optimized (EV-DO), and/or other data communication technologies.

Device 10 comprises a receiver 38 which comprises analog and/or digital electrical components configured to receive and transmit wireless signals via antenna 22 to provide cellular telephone and/or data communications with a fixed wireless access point, such as a cellular telephone tower, in conjunction with a network carrier, such as, Verizon Wireless, Sprint, etc. Device 10 can further comprise circuitry to provide communication over a local area network, such as Ethernet or according to an IEEE 802.11x standard or a personal area network, such as a Bluetooth or infrared communication technology.

Device 10 further comprises a microphone 36 (see FIG. 2) configured to receive audio signals, such as voice signals, from a user or other person in the vicinity of device 10, typically by way of spoken words. Alternatively or in addition, processor 40 can further be configured to provide video conferencing capabilities by displaying on display 18 video from a remote participant to a video conference, by providing a video camera on device 10 for providing images to the remote participant, by providing text messaging, two-way audio streaming in full- and/or half-duplex mode, etc.

Device 10 further comprises a location determining application, shown in FIG. 3 as GPS application 44. GPS application 44 can communicate with and provide the location of device 10 at any given time. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may be arranged to operate in one or more location determination modes including, for example, a standalone mode, a mobile station (MS) assisted mode, and/or an MS-based mode. In a standalone mode, such as a standalone GPS mode, device 10 may be arranged to autonomously determine its location without real-time network interaction or support. When operating in an MS-assisted mode or an MS-based mode, however, device 10 may be arranged to communicate over a radio access network (e.g., UMTS radio access network) with a location determination entity such as a location proxy server (LPS) and/or a mobile positioning center (MPC).

Device 10 further comprises a memory, shown as cache 42 (e.g., a cross-reference table, a device registry, etc.). According to an exemplary embodiment, cache 42 is configured to include data for various computing and other electronic devices. For each device, cache 42 may include a device identifier (e.g., a network address, a Bluetooth address, etc.), a device type (e.g., a computer, a phone, a printer, etc.), and a common name for the device. The common name may be a name that is assigned to the particular device by the user of the device (e.g., "Tom's phone," etc.). The data stored in cache 42 may be referenced by processor 40 as discussed in more detail below. According to one embodiment, cache 42 stores a Bluetooth address, a device type, and a common name.

Figure 5:
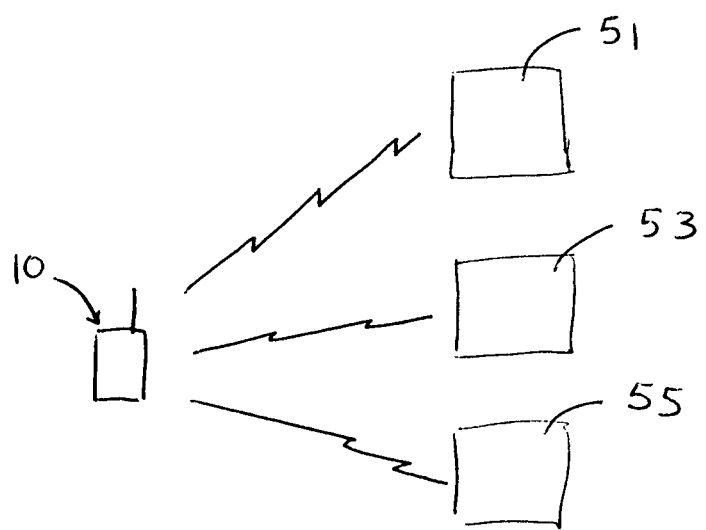
FIG. 5 is an illustration of a mobile computing device wirelessly communicating with other electronic devices according to an exemplary embodiment.

Referring now to FIG. 5, device 10 is shown in communication with a number of other electronic or computing devices 51, 53, 55 according to an exemplary embodiment. According to an exemplary embodiment, device 10 is configured to communicate with devices 51, 53, 55 using a variety of types of wireless communications, including Bluetooth communications. According to one embodiment, devices 51, 53, 55 may include one or more "companion devices" to device 10, such as a laptop with a larger display and/or keyboard. Such a companion device may synchronize with device 10 using Bluetooth communications or othe means of communications. The wireless communications may further include communications via a cellular communications network, infrared communications, etc. While some of the embodiments illustrated herein are discussed in conjunction with the use of Bluetooth communications, it should be understood that the embodiments herein are also applicable to other forms of wireless communications (e.g., IEEE 802.11x, infrared, etc.).

According to an exemplary embodiment, if a user wishes to communicate with one or more of devices 51, 53, 55 using Bluetooth communications, device 10 first identifies any available electronic devices (e.g., devices 51, 53, 55 shown in FIG. 5) capable of Bluetooth communications with device 10. The process of identifying other devices capable of communicating with device 10 over a Bluetooth network is often referred to as the "inquiry" step (e.g., the device is inquiring whether there are other available devices). As a result of this inquiry process, a number of devices and associated device identifiers (e.g., Bluetooth addresses) and/or device types may be identified. Processor 40 may be configured to provide a display that includes for each device one or more of the Bluetooth address of the device, the device type, and a first or generic name (e.g., a name based on the device type, such as "Unknown computer," etc.).

Figure 6:
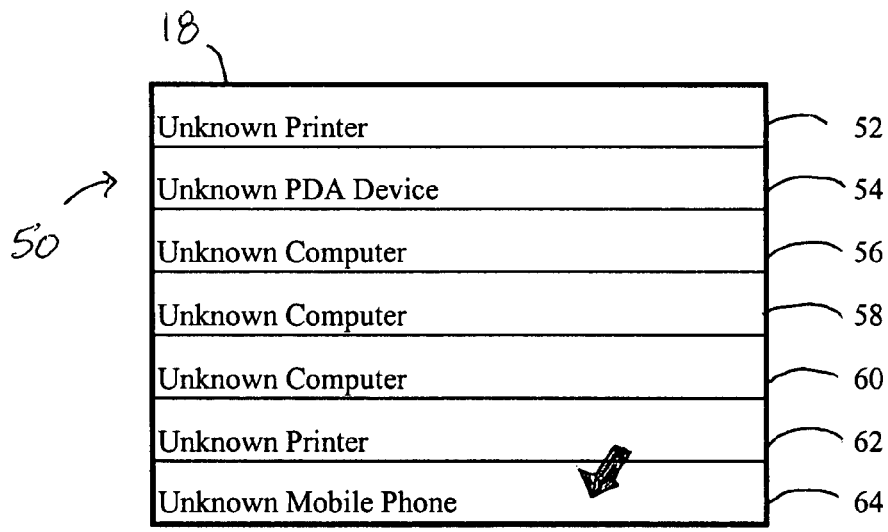
FIGS. 6-8 are illustrations of a display of the mobile computing device of FIG. 1 according to various exemplary embodiments.

For example, as shown in FIG. 6, display 18 is shown according to an exemplary embodiment as providing a list 50 (e.g., a textual listing, a group of selectable icons, etc.) of generic names of devices identified as a result of an inquiry process intended to identify other devices capable of Bluetooth communications with device 10. As shown in FIG. 6, list 50 may include a number of generic names, such as Unknown Printer 52, Unknown PDA Device 54, Unknown Computer 56, Unknown Computer 58, Unknown Computer 60, Unknown Printer 62, and/or Unknown Mobile Phone 64. List 50 may display information associated with a wide variety of computing or other electronic devices that are capable of communicating over a Bluetooth network with device 10, including PDA's, cellular or other mobile phones, printers, fax machines, desktop computers, laptop computers, and so on. The devices represented in list 50 are provided for purposes of illustration only, and are not intended to be limiting.

According to an exemplary embodiment, after device 10 has performed the initial inquiry process, and identified and listed the generic names for any other available devices (e.g., one or more of devices 51, 53, 55, etc.), processor 40 determines the common (e.g., second, user-friendly, friendly, user-programmed, etc.) names of the various devices (i.e., device 10 "resolves" the names of the devices on list 50). The process of resolving the generic names of the various devices to determine the common names of the devices is often referred to as a "name resolution" or "resolution" process. The resolution process may include receiving a common name from a remote device (e.g., one of devices 51, 53, 55). According to an exemplary embodiment, the generic names provided on list 50 are resolved in the order they are displayed (e.g., top to bottom).

Figure 7:
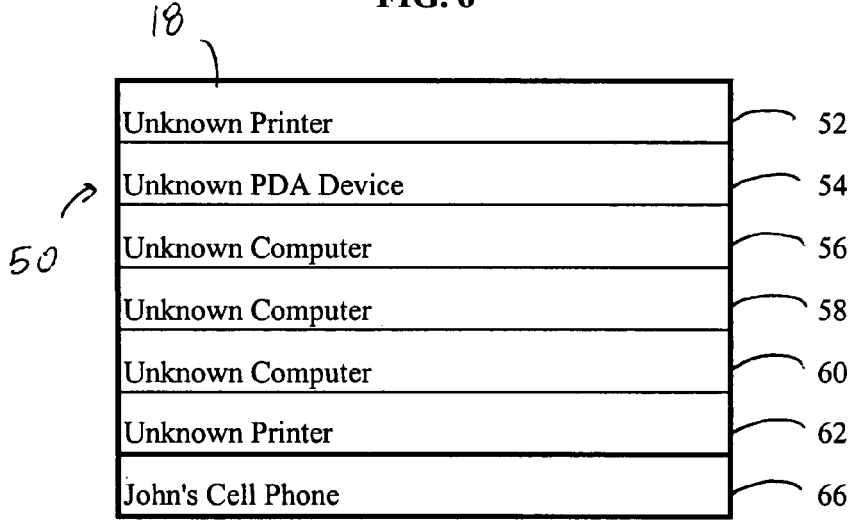

According to an exemplary embodiment as shown in FIGS. 6 and 7, device 10 may permit a user to select one of generic names 52-64 from list 50 using, for example, a cursor, a stylus, a fingertip, a "soft button" provided on display 18, or any of a wide variety of input devices. Upon the user selecting, for example, generic name 64 ("Unknown Mobile Phone"), processor 40 identifies the common name for that device prior to identifying the common names of any other devices having generic names displayed. This permits a user to, for example, select the generic name of a computer (e.g., Unknown Computer 60) when the user knows he or she is looking for a computer rather than a printer, PDA, etc. This avoids unnecessary delays that may otherwise be associated with the waiting time associated with processor 40 identifying the common names for devices that a user can discern, from the generic name, are not the device(s) the users wishes to communicate with.

For example, as shown in FIG. 6, a user may select the generic name Unknown Mobile Phone 64. Processor 40 identifies the common name associated with Unknown Mobile Phone 64 prior to identifying the common names of one or more or all of the other devices represented on the list. As shown in FIG. 7, John's Cell Phone 66 (corresponding to Unknown Mobile Phone 64 shown in FIG. 6) is identified before that of Unknown Printer 52, Unknown PDA Device 54, Unknown Computer 56, Unknown Computer 58, Unknown Computer 60, and Unknown Printer 62.

Upon processor 40 determining one or more common names (e.g., "John's Cell Phone") in list 50, a user may choose to initiate wireless communications with the device(s). For example, in order to initiate communications using a Bluetooth network, a user may select the common name of a device from list 50 using an input device, or alternatively, the user may be presented with a "connect" button on device 10 or as a part of display 18. Upon the user selecting a common name, processor 40 establishes a Bluetooth communication link with the device(s) associated with the selected common name.

According to an exemplary embodiment, upon a Bluetooth link being established, processor 40 ceases to continue identifying the common names associated with any remaining generic names on list 50. According to another exemplary embodiment, processor 40 continues to identify the generic names associated with the remaining generic names provided on list 50 in the "background" while a user communicates with one or more devices using a Bluetooth network.

Figure 8:
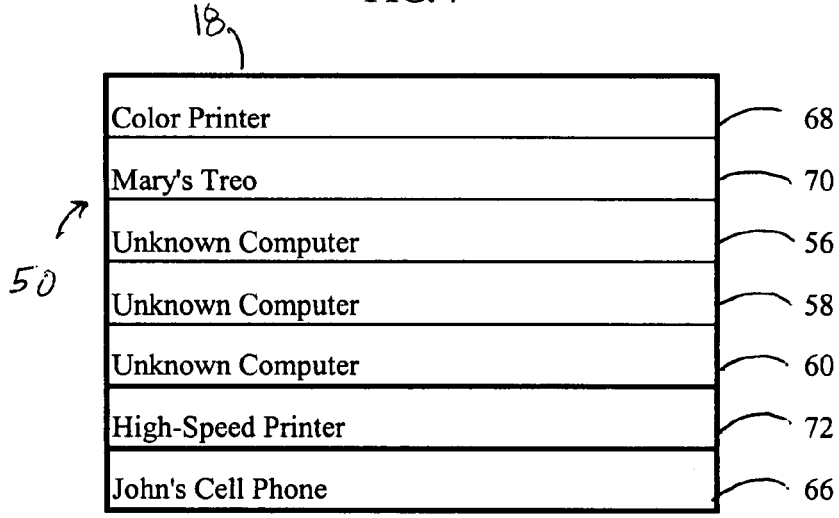

According to an exemplary embodiment, if a common name is displayed, but the user does not initiate a communication link with the device associated the common name, processor 40 continues to identify and display the common names for the other devices in the order listed (e.g., in a top to bottom order of a list such as list 50 shown in FIG. 6). For example, as shown in FIGS. 6-8, a user may have initially selected Unknown Mobile Phone 64 (FIG. 6), which processor 40 identified as having an associated common name of John's Cell Phone 66 (FIG. 7). If John's Cell Phone is not the device the user wishes to communicate with, the user may elect not to establish a Bluetooth link with the device. In such a case, processor 40 proceeds to continue resolving list 50 in order (e.g., "Color Printer 68, Mary's Treo 70, etc.) (see, e.g., FIG. 8). The user may at any time during the resolution process select one of the generic names from list 50, upon which processor 40 will identify the associated common name.

According to an exemplary embodiment, processor 40 is configured to store data associated with devices 51, 53, 55 in cache 42 or other high speed buffer or memory. For example, processor 40 may store the Bluetooth address, the device type, and the common name for a particular device. According to one embodiment, processor 40 stores the data in cache 42 upon determining the common name for the device. Processor 40 may then access this data during future use of device 10, rather than going through the name resolution process (i.e., processor 40 may display any common names that are in the cache and are associated with any of the devices provided on, for example, list 50, rather than performing the name resolution process).

According to an exemplary embodiment, device 10 is configured such that a user may disable the use of cache 42, such that the common names are identified using the name resolution technique described above. Furthermore, device 10 may permit users to purge cache 42 to remove some or all of the data stored therein. Disabling or purging cache 42 may assist in ensuring that only the most up-to-date common names are used and provided as common names. Further yet, a user may reconfigure or modify the data in cache 42 (e.g., to provide updates to common names that the user is aware of, etc.). According to an exemplary embodiment, processor 40 is further configured to update cache 42 automatically upon receiving the device identifier, device type, and/or common name for a specific device.

According to an exemplary embodiment, a user may choose to "refresh" a common name that is provided on list 50 from cache 42. For example, should a user be presented with a list that includes both generic names and common names (including common names retrieved from cache 42), the user may select one of the common names that was retrieved from cache 42. In such a case, processor 40 may communicate with the device associated with the selected common name to obtain any changes updates, etc. in the common name or other data associated with the device. The updated common name and other data may then be stored in cache 42.

Figure 9:
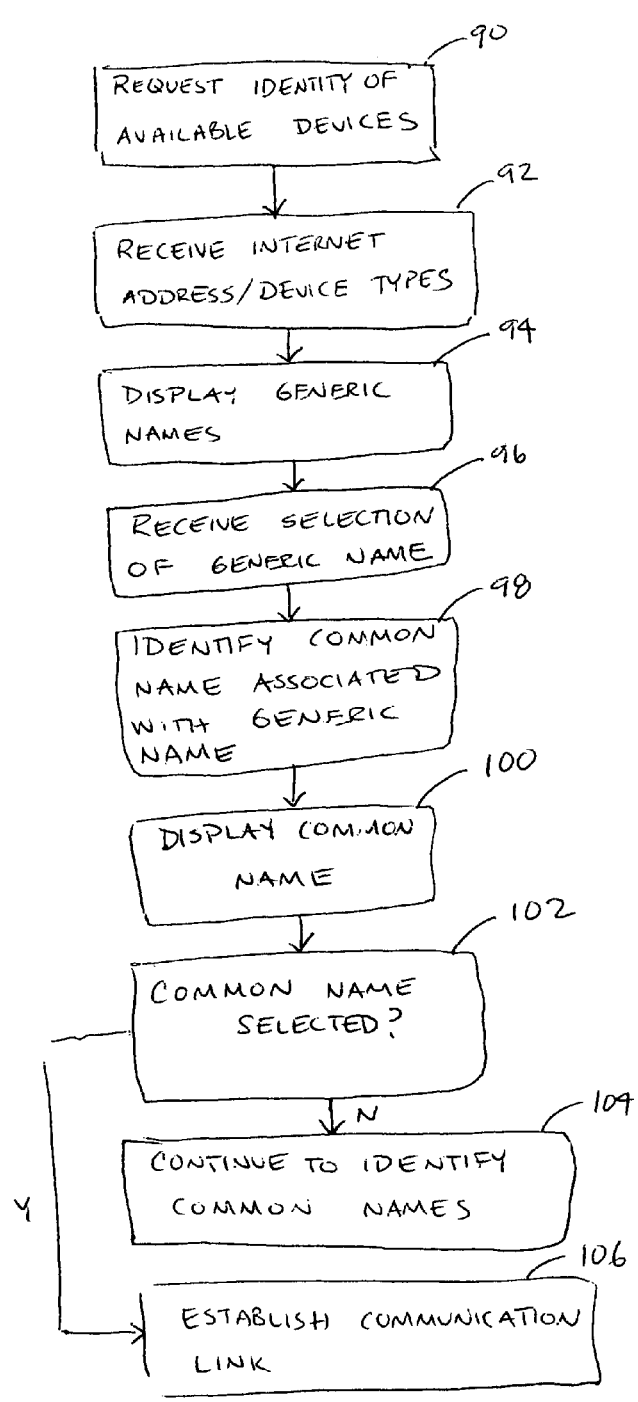
FIG. 9 is a flow chart illustrating a method of communicating with electronic devices according to an exemplary embodiment.

Referring now to FIG. 9, a method of establishing a wireless communications link with one or more other devices is shown according to an exemplary embodiment. At step 90, device 10 sends a request for the identity of any devices within range of device 10 that are capable of wireless communications with device 10. At step 92, processor 40 receives the device identifier and/or the device type of one or more devices. At step 94, the generic names (or alternatively or in addition, the device identifier and/or the device type) is displayed. At step 96, processor 40 receives a selection from the user of one of the generic names displayed on device 10. At step 98, the processor identifies the common name of the selected device.

At step 100, the common name of the selected device is displayed to the user. At step 102, processor 40 determines whether the common name has further been selected to initiate a wireless connection. If so, at step 106, a wireless connection is established with the selected device. If the user does not select one of the common names, at step 104, processor 40 continues to identify the common names associated with the generic names in the order the names are displayed. Processor 40 continues to identify the common names for the generic names until the user chooses to initiate a wireless connection or until all of the names are resolved.

Figure 10:
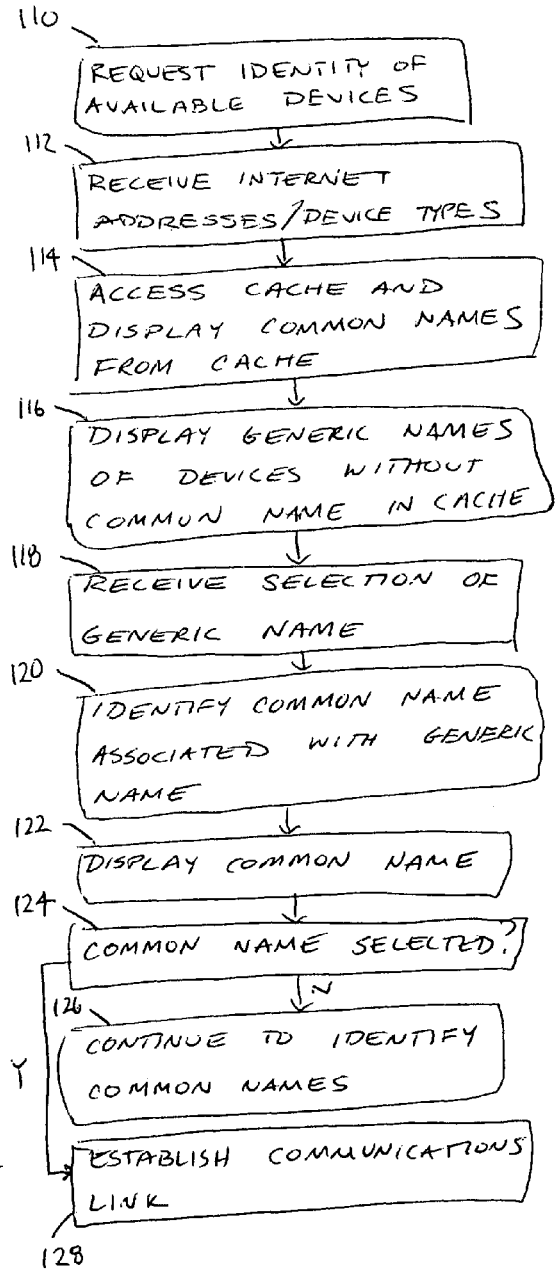
FIG. 10 is a flow chart illustrating a method of communicating with electronic devices according to an exemplary embodiment.

Referring now to FIG. 10, a method of establishing a wireless communications link with one or more other devices is shown according to another exemplary embodiment. At step 110, processor 40 sends a request for the identity of any devices within range of device 10 that are capable of wireless communications with device 10. At step 112, processor 40 receives the device identifier and/or the device type of one or more devices. At step 114, processor 40 accesses cache 42 and identifies any common names that are stored in cache 42 and provides them on display 18. At step 116, the generic names (or alternatively or in addition, the device identifier and/or the device type) of any devices not having common names in cache 42 are displayed.

At step 118, processor 40 receives a selection from the user of one of the generic names displayed on device 10. At step 120, the processor identifies the common name of the of the selected device. At step 122, the common name of the selected device is displayed to the user. At step 124, processor 40 determines whether any common name displayed on device 10 has further been selected to initiate a wireless connection. If so, at step 128, a wireless connection is established with the selected device. If the user does not select one of the common names, at step 126, processor 40 continues to identify the common names associated with the generic names in the order the names are displayed. Processor 40 continues to identify the common names for the generic names until the user chooses to initiate a wireless connection or until all of the names are resolved.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A mobile computing device comprising:
a processor;
a transceiver coupled to the processor; and
a display device coupled to the processor;
wherein the processor:
associates a plurality of generic names with a plurality of electronic devices, each generic name being associated with each of the plurality of electronic devices, and each of the electronic devices being capable of communicating with the mobile computing device;
displays the associated generic name for each of the plurality of electronic devices on the display device; and
for at least some of the displayed generic names, automatically changes the displayed generic names to common names in a predefined order, wherein each generic name is based on a device type of the associated electronic device.

2. The mobile computing device of claim 1, wherein each of the plurality of electronic devices is capable of Bluetooth communications with the mobile computing device.

3. The mobile computing device of claim 1, wherein the processor automatically changes the displayed generic names to the common names for at least some of the displayed generic names by changing the displayed generic names to the common names in the predefined order until the processor receives an input from a user to initiate a communication link with one of the plurality of electronic devices.

4. The mobile computing device of claim 1, wherein the processor:
stores the plurality of generic names and the common names changed from the at least some of the displayed generic names in a memory coupled to the processor.

5. The mobile computing device of claim 4, wherein the processor further updates each common name that is stored in the memory by communicating with the plurality of electronic devices that are associated with the plurality of generic names.

6. The mobile computing device of claim 1, wherein the processor:
associates each common name with one of the plurality of electronic devices;
receives a selection of a common name; and
establishes a communication link with the one of the plurality of electronic devices associated with the selected common name.

7. The mobile computing device of claim 6, wherein the communication link is a Bluetooth communications link.

8. The mobile computing device of claim 6, wherein the display device comprises a touch screen, and wherein the processor is receives the selection of the common name via the touch screen.

9. The mobile computing device of claim 1, wherein the mobile computing device is a handheld computer.

10. A method of identifying electronic devices using a mobile computing device, the method being performed by one or more processors of the mobile computing device and comprising:
identifying a plurality of electronic devices capable of wireless communications with the mobile computing device;
associating a plurality of generic names with the plurality of electronic devices, each generic name being associated with each of the plurality of electronic devices;
displaying the associated generic name for each of the plurality of electronic devices on a display device; and
for at least some of the displayed generic names, automatically changing the displayed generic names to common names in a predefined order, wherein each generic name is based on a device type of the associated electronic device.

11. The method of claim 10, wherein the wireless communications comprise Bluetooth communications.

12. The method of claim 10, further comprising:
storing the plurality of generic names and the common names changed from the at least some of the displayed generic names in a memory coupled to the processor.

13. The method of claim 10, wherein automatically changing the displayed generic names to the common names for at least some of the displayed generic names comprises changing the displayed generic names to the common names in the predefined order until receiving an input from a user to initiate a communication link with one of the plurality of electronic devices.

14. The method of claim 10, wherein the mobile computing device comprises a handheld computer.

15. A method of using a mobile computing device for wireless communications, the method being performed by one or more processors of the mobile computing device and comprising:
    identifying a plurality of electronic devices capable of wireless communications with the mobile computing device using a Bluetooth communications link;
    associating a plurality of generic names with the plurality of electronic devices, each generic name (i) being associated with each of the plurality of electronic devices, and (ii) indicating at least one of an internet address or a device type for an associated electronic device of the plurality of electronic devices;
    displaying, in a list, the associated generic name for each of the plurality of electronic devices on a display device; and
    for at least some of the displayed generic names, automatically changing the displayed generic names to common names in a predefined order, wherein each generic name is based on a device type of the associated electronic device.

16. The method of claim 15, further comprising:
    storing the plurality of generic names and the common names changed from the at least some of the displayed generic names in a memory provided in the mobile computing device.

17. The method of claim 15, wherein automatically changing the displayed generic names to the common names for at least some of the displayed generic names comprises changing the displayed generic names to the common names in the predefined order until receiving an input from a user to initiate the Bluetooth communications link with one of the plurality of electronic devices.

18. The method of claim 15, wherein the wireless communications comprise Bluetooth communications.

* * * * *